United States Patent [19]
Bendell

[11] 4,323,918
[45] Apr. 6, 1982

[54] OPTICAL ASSEMBLY FOR COLOR TELEVISION

[75] Inventor: Sidney L. Bendell, Riverton, N.J.

[73] Assignee: RCA Corporation, New York, N.Y.

[21] Appl. No.: 180,897

[22] Filed: Aug. 25, 1980

[51] Int. Cl.³ .............................................. H04N 9/09
[52] U.S. Cl. ......................................... 358/50; 358/55
[58] Field of Search .................................. 358/50, 55

[56] References Cited

U.S. PATENT DOCUMENTS 4,166,280  8/1979  Poole ...................................... 358/50
4,237,480 12/1980  Fraken et al. ......................... 358/55

OTHER PUBLICATIONS

"Optoelectronic Sensor Makes Images Quasi-One-Dimensional for Fast Processing", pp. 84-86, *Electronics*, May 22, 1980.

"A High-Resolution, High-Speed Film Scanner System Using Optically Butted Charge-Coupled Devices (CCOs)", pp. 156-165 *SPIE* vol. 149, 1978.

*Primary Examiner*—Richard Murray
*Attorney, Agent, or Firm*—Eugene M. Whitacre; Paul J. Rasmussen; William H. Meise

[57] ABSTRACT

An optical assembly for a color camera includes a prism for splitting light entering an entry port into color components of the light which appear at output ports. Each color component is applied to an individual solid-state imager. In order to minimize size and maximize rigidity and reliability, the imagers are bonded to the prism. In order to equalize the effective lengths of the light paths, spacers are interposed between the imagers and the prism.

13 Claims, 6 Drawing Figures

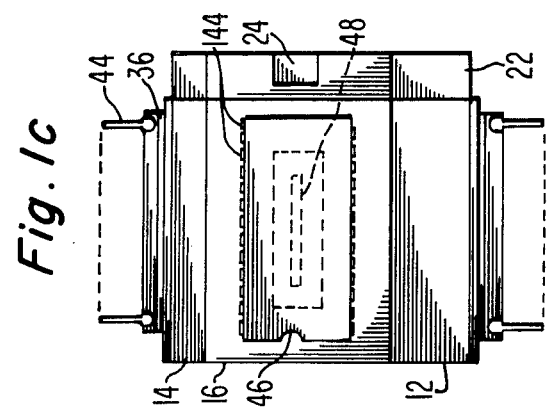
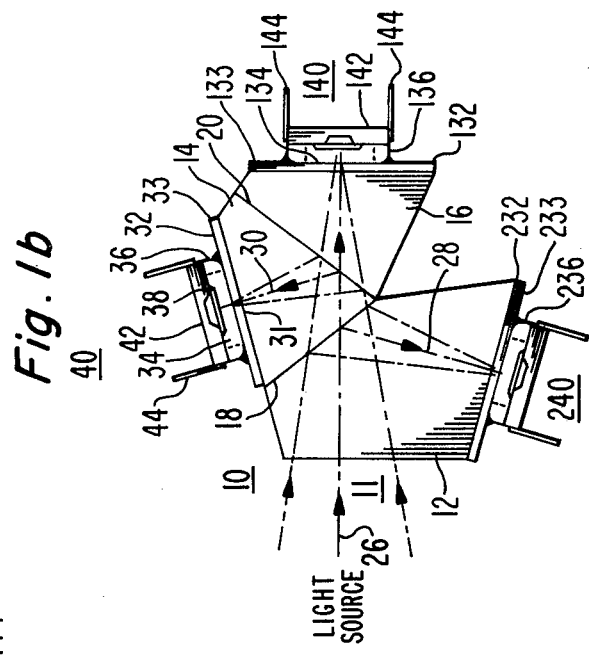
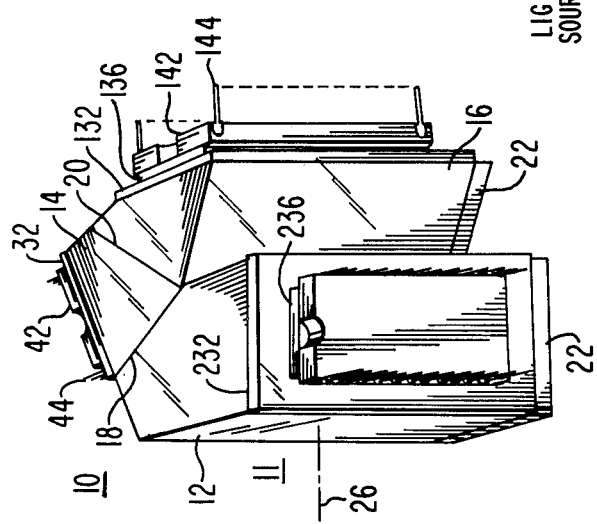

OPTICAL ASSEMBLY FOR COLOR TELEVISION

BACKGROUND OF THE INVENTION

This invention relates to optical assemblies for color television including color splitting prisms and solid-state imagers.

Monochrome television cameras previously used vacuum camera tubes as transducers for generating a sequential electrical signal representative of the brightness of a scene by line-scanning the photosensitive surface of the camera tube. The image of a scene to be televised was focused on the photosensitive surface by a lens system. With the advent of color television, means were required to produce signals representative of the various colors of the scene being televised. One way in which color-representative signals could be generated would be to fit each of three cameras with appropriate color filters and focus each one through its own individual lens onto a scene to be televised. Such an arrangement, however, requires three lenses, and views the scene from three different locations, thereby producing parallax error. Additionally, three separate cameras are difficult to maintain in registration except on a stationary basis.

Another way of generating color television signals is by the use as transducers of three camera tubes, each viewing the scene to be televised through an individual color filter and all three being optically multiplexed through a common lens system by means of a light-splitting arrangement. In such an arrangement, the requirement for a multiplicity of lenses is avoided and parallax error is eliminated, and the registration problem is solved by adjusting the position of each camera tube relative to the exit port of the light-splitting assembly to which it is optically coupled. Thus, by viewing the scene on a monitor by way of one of the camera tubes such as the green camera tube, the red camera tube image can be superimposed electrically on the green image, and the red tube can be adjusted relative to the light-splitting arrangement so as to exactly superimpose or register the images being viewed. The blue camera tube is then manipulated so as to superimpose the blue component of the image as viewed on the monitor with the registered green and red images. The manipulators are then locked in the position which gives the best registration.

In recent years, a great deal of attention has been directed toward solid-state imagers such as charge-coupled imagers. These imagers have the advantages of discrete light-sensing areas which can be addressed either individually or in groups, small size, light weight, and they have no inherent degradation mechanism to cause early failure. However, the solid-state imagers have disadvantages in that they are subject to inherent defects which occur during manufacture, the design and packaging are not standardized, and complex electronics may be required for their control. It is desirable to eliminate the bulk and weight of prior art cameras, improve reliability and reduce maintenance.

SUMMARY OF THE INVENTION

A color television camera includes a rigid optical light-splitting arrangement having a light input port and more than one light output port to which light from a scene to be televised passes from the light input port. Charge-coupled imagers or other transducers are coupled to the light output ports for generating electrical signals in response to the light. At least one of the transducers is bonded in a fixed position to the corresponding output port of the light splitting arrangement.

DESCRIPTION OF THE DRAWING

FIGS. 1 a–c illustrate an optical and CCD assembly in accordance with the invention;

DESCRIPTION OF THE INVENTION

Figure 2:
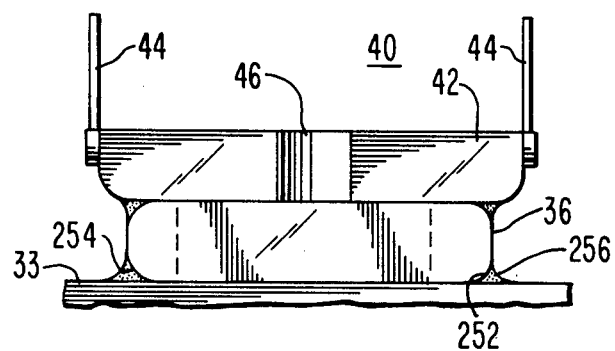
FIG. 2 is a detail illustrating a portion of FIG. 1.

FIG. 1 illustrates an optical assembly according to the invention. In FIG. 1, a light-splitting prism designated generally as 10 is formed from three optical glass portions 12, 14 and 16 separated by dichroic surfaces illustrated in FIG. 1b as lines 18 and 20. A base 22 affixed to the prism provides a mounting surface for the assembly and includes an indexing notch 24 by which the assembly may be placed exactly in position in a camera. Light from a source (not shown) enters the prism along an optical axis 26 at an input port designated generally as 11 lying along the left edge (as illustrated in FIG. 1b) of portion 12 of the prism. This light represents a scene to be televised and may include red, green and blue components. The blue component of the light passing through portion 12 of the prism is reflected along axis 28 by dichroic surface 18, while the remaining yellow portion of the light from the scene passes into portion 14 of the prism. The red component of the light passing through portion 14 of the prism is reflected along axis 30 by dichroic surface 20. The remaining green component of the incident light from the scene continues along axis 26 through dichroic surface 20 into portion 16 of prism 10.

The separated red light reflected along axis 30 by dichroic surface 20 passes through portion 14 of the prism and exits from an exit port 31 of the prism, and through a trimming filter 32. The light continues along axis 30 until it exits from trimming filter 32 at surface 33. A portion of surface 33 can be considered the red light exit port of the light-splitting prism. The light continuing from surface 33 along axis 30 enters an air space 34 within a hollow spacer 36, and finally enters a window 38 of an imaging device designated generally as 40. Imaging device 40 as illustrated is a charge-coupled device (CCD) intended for line scanning. CCD 40 includes a rigid nonconductive integrated-circuit (IC) body 42 and electrical connection pins 44. Similarly, the green light passing through dichroic surface 20 and through portion 16 of prism 10 along axis 26 enters in succession a green trim filter 132, a passage or space 134 within a spacer 136 and finally the window of a CCD imager designated generally as 140 housed within a rigid nonconductive body 142 having electrical connection pins 144. The blue light reflected from dichroic surface 18 similarly passes through a blue trim filter 232, and a spacer 236 to enter imager 240. Trimming filters 32, 132 and 232 trim the spectral response of the light reaching each imager to achieve exactly the desired colorimetry, and portions of their outermost surfaces 33, 133, 233 can be considered optical output ports.

The effective optical path lengths from entrance port 11 to the red, green and blue exit ports of light-splitting prism 10 are designed to be precisely the same by proper design of the size of the prism and of the trim filters. However, the position of the active portion of the imager within the body of the integrated circuit housing is not well controlled during manufacture.

Spacers 36, 136 and 236 have a thickness selected in conjunction with the physical characteristics of the imager IC with which they are to be used. For example, if red imager 40 has its active portion set deeper into the surface of IC body 42 than average, the thickness of spacer 36 will be selected in such a fashion that it is thinner than average, thereby maintaining the active portion of imager 40 fixed at a preselected nominal distance from the outer surface of red trim filter 32. Similarly, if the active portion of green imager 140 is at the nominal distance below the window or outer surface of body 142, spacer 136 can have the nominal thickness which provides for the desired predetermined spacing of the active portion of the imager from the red output port at the outer surface of red trim filter 132. In a like manner, the thickness of spacer 236 is selected in conjunction with the characteristics of IC 240. Thus, the effective optical path length from light entrance port 11 of the prism to an imager is the same for each color of light in each of the three described paths. This control of the optical distance between the light input port and each of the imagers makes it possible to properly register the images entering the input port from an objective lens (not shown). If the effective optical path lengths were unequal, different size images would be generated at each of the imagers, making registration impossible. Also, if the effective optical path lengths were unequal, these different size images would not be optimally focussed, making optimum resolution impossible to achieve.

Thermal effects can change the size of optical components. This makes the problem of maintaining image registration severe. In order to maintain registration even in the presence of temperature changes, the spacers and the IC body to which the imager is affixed are formed of a rigid nonconductive material having a coefficient of thermal expansion similar to or the same as that of the prism materials. In the illustrated embodiment, this is a ceramic material.

In the view of FIG. 1c, the structure of the body 40 of the red imager is more easily recognized than in FIG. 1b. In FIG. 1c, the array of electrical contact pins 144 is apparent. The solid-state imager is addressed, powered and the signals are coupled to appropriate circuits by way of pins 144 which are adapted to be coupled to a standard multipin IC socket. The shape shown in phantom lines of the active imaging portion 48 of imager 140 as illustrated in FIG 1c makes it clear that the imagers of the embodiment shown are line-scan types rather than two-dimensional arrays. Such line-scan imagers are used for transducing motion-picture film images.

In FIG. 2, red imager IC 40, spacer 36 and the outer surface 33 of red trim filter 32 are shown in cross section. Spacer 36 can be seen to have undercut edges 252 and 254 adjacent the contact with trim filter surface 33. These bevelled or curved surfaces allow a bonding agent or adhesive to be used during final assembly without increasing the separation between spacer 36 and surface 250 by the presence of a layer of adhesive. Similar bevelled surfaces appear at the junction of spacer 36 and IC body 42. As illustrated adjacent bevelled surface 252, the bonding agent (illustrated as a darkened region 256) occupies the edge interstice between spacer 36 and surface 33 and spreads slightly into the surrounding region.

As mentioned, the length of the light path from the optical input port of prism 10 to each of the output ports is equal. Similarly, each imager is mounted to a spacer so as to maintain fixed the distance of the active portion of the imager from the outermost edge of the spacer. During final assembly, a first imager is bonded to an output port and connected by appropriate interface electronics to a television display monitor. The input port is illuminated with light from a scene including a crosshatch pattern or equivalent test pattern. A monochrome monitor may be used. The monitor will display a flat field and the test pattern. If assembly of the optical arrangement begins with green imager 140, imager 140 with its attached spacer 136 is mechanically mounted adjacent the outer surface of trim filter 132. The imager is positioned symmetrically on the main optical axis and the green channel is thereafter considered the reference channel. Spacer 136 is then bonded in the chosen position.

The assembly continues by connecting the signal output to one of the other imagers to the monitor and mechanically applying the imager to the corresponding light port. The signal output of the second imager creates an image of the test pattern which is electrically superimposed on the image generated from the green signal. For example, if red imager 40 is to be mounted next, the monitor is viewed and imager 40 is moved about until the raster as viewed has the red-derived image or field superimposed on the green-derived image so both images as viewed or the monitor are in registry. Imager 40 is then bonded into position. Similarly, blue imager 240 is bonded into an appropriate position at its associated output light port such that the blue-derived image is registered with or matches the image previously displayed.

The assembly operation may be speeded by use of a known ultraviolet-sensitive bonding agent. The bonding agent may be applied to the juncture between the spacer and the output port before the alignment of the CCD into the appropriate position begins. When the correct position has been found, the bonding agent is exposed to ultraviolet light, which causes almost instantaneous setting. Consequently, there is no waiting time for the bonding agent or adhesive to set, reducing the possibility of inadvertent motion of the imager relative to the output port.

As described, a light splitting arrangement in the form of a prism or a prism or a prism with trim filters is rigidly bonded to a plurality of registered imaging transducers to form a lightweight rigid assembly. The bonding and the low mass of the imagers together with the inherent thermal integrity prevents relative motion between imagers and prism which might cause misregistration. Since there can be no misregistration, there is no need for bulky and massive manipulators to allow for readjustment of the registration. Similarly, since the solid-state imagers have no inherent degradation mechanisms, there is no need for periodic disassembly such as is required for replacing camera tubes.

The small size, light weight and rigidity of the assembly make practical certain applications previously prohibited by the bulk and lack of rigidity of the manipulator arrangements.

Figure 3:
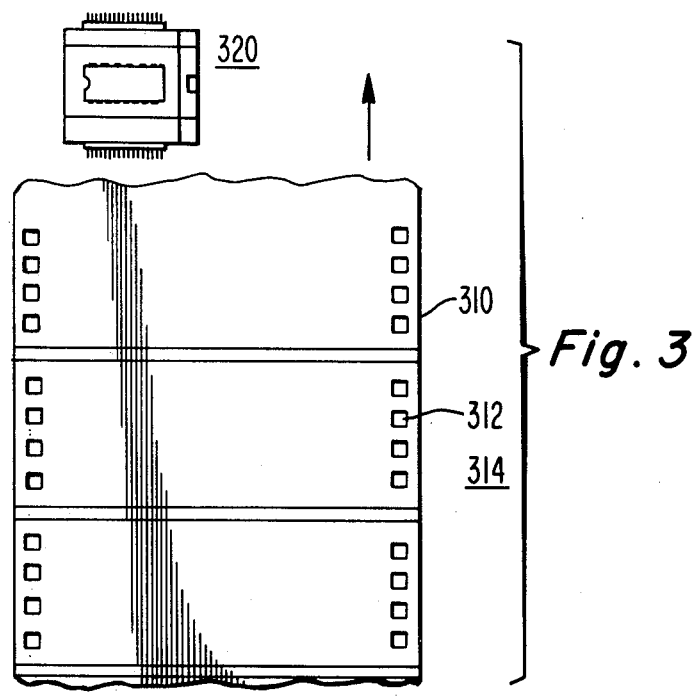
FIG. 3 is a sketch as an aid to understanding a use of the invention.

FIG. 3 illustrates a portion 310 of a widescreen movie film having sprocket holes 312 and image portions or frames designated generally as 314. The aspect ratio of a frame 314 may be much greater than the aspect ratio for television. For example, the horizontal-to-vertical aspect ratio of television is 4:3. Wide-screen movie format may be as wide as 8:2. Thus, the aspect ratio for film does not correspond with that for television. It is possible to directly view the 8:2 compressed image on a television raster, but this results in an unnatural appearance of the images or people, and also results in substantial illegibility of written matter. It is known to use anamorphic or anamorphotic lenses to expand the image of the wide-screen film format horizontally to form an image with normal proportions, but such an image has a width substantially exceeding the width which can be displayed on a television raster. Consequently, in preparing the film for television, it often becomes necessary to make an editing decision as to which portion of the movie frame will be displayed on television. It is known to use a pivotally mounted television camera with a servomechanism which uses a projected movie image. The television camera is controlled by the servomechanism which in turn is controlled by commands from a preprogrammed editing arrangement which stores information relative to the desired portion of the movie to be televised. During each scene, the stored editing instructions cause the camera to pivot to view the appropriate portion of the projected image. This arrangement has the disadvantage that the entire camera must be moved, which requires a powerful servomechanism. Also, the mass of the camera is large, so rapid motion cannot be achieved. Even if rapid motion could be achieved, the mass of the manipulators and relatively low rigidity of the prior art arrangements might result in movement of the imagers relative to the prism, and thus cause misregistration.

Figure 4:
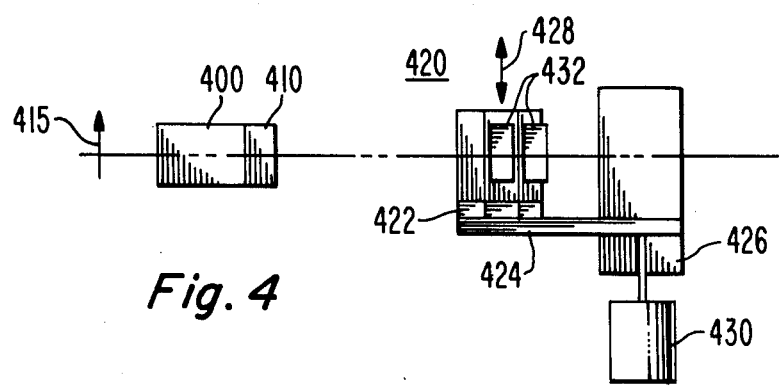
FIG. 4 is a block diagram which shows a use of the arrangement of FIG. 1.

The line-scan-optical/CCD arrangement of FIG. 1 is also shown in FIG. 3 and designated 320. Such a line scan assembly as is known scans movie film 310 by virtue of motion of the film in the direction of the arrow across the scanning aperture of line scan arrangement 320. The light weight of the integrated assembly combined with its mechanical integrity makes possible lateral movement of the entire assembly across the film. This movement may be controlled to allow positioning of the image sensors at any transverse position along the width of the image. Such movement may be controlled by an appropriate mechanism, such as a rack and pinion controlled by a servo motor. Control of the servo system may be effectuated by an electrical control manually operated by an editor or the control may be preprogrammed and read out of memory. FIG. 4 illustrates schematically a structure suited to scanning a wide-format film. In FIG. 4, a lens 400 and anamorphic lens attachment 410 are interposed between moving film 415 and an integrated CCD imager and prism assembly 420. Only the edge of film 415 is seen in the view of FIG. 4, and its motion is upward in a direction out of the paper. Optical assembly 420 is affixed to a base 422 corresponding to base 22 of the arrangement of FIG. 1. Base 422 holds optical assembly 420 onto an arm 424 which is arranged in conjunction with a track 426 for motion of the arm 424, base 422 and assembly 420 for lateral motion relative to the axis of lens 400 in the direction of arrow 428. A drive mechanism, illustrated as a motor 430, controls the drive of arm 424 relative to fixed track 426 under the control of an operator. Conductors or leads 432 are connected to the imagers to provide signals representative of the images being transduced.

Other embodiments of the invention will be obvious to those skilled in the art. For examaple, two-dimensional array imagers or CCD sensors may be used instead of line-scan types. Rather than using spacers such as 36 to separate the IC body from the light output port, the spacer may be integral with the IC body and may have its dimensions controlled so as to maintain the active portion of the imager at a fixed distance from the light output port when bonded to it.

What is claimed is:

1. An improved color television camera arrangement comprising:
   rigid optical light-splitting means having a light input port and a plurality of light output ports to which light passes from said input port;
   a plurality of transducers coupled to said output ports for generating electrical signals in response to said light;
   wherein the improvement lies in that a portion of said plurality of transducers is bonded in a fixed position by a single-phase adhesive to a corresponding portion of said plurality of said output ports.

2. A camera according to claim 1 wherein said light-splitting means splits light entering said input port on the basis of color, whereby said light passing from said input port to an output port is principally of one color.

3. A camera according to claim 2 wherein said light-splitting means is an optical prism, and said input and output ports are faces of said prism.

4. A camera according to claim 3 wherein said portion of said first and second pluralities is two.

5. A camera according to claim 3 wherein said first and second pluralities are three, and said portion is also three.

6. A camera according to claim 1 wherein said portion of said first and second pluralities is one, whereby one of said transducers is bonded in a fixed position to an output port.

7. A camera according to claim 1 wherein said light output ports are at substantially equal optical path lengths from said light input port; and said fixed position at which each of said transducers of said position of said second plurality of transducers are bonded is at predetermined optical distance from the corresponding optical output port.

8. A camera according to claim 7, wherein said predetermined distance is established by spacer means.

9. A camera according to claim 1 wherein said transducers are charge-transfer devices.

10. A camera according to claim 9 wherein said charge-transfer devides are charge-coupled devices.

11. A camera according to claim 10 wherein said charge-coupled devices are charge-coupled imagers.

12. A camera according to claim 11 wherein said imagers are registered.

13. A camera according to claim 12 further comprising an optical lens for imaging at least a portion of a scene to be televised.

* * * * *